(12) United States Patent
Trimble et al.

(10) Patent No.: US 7,320,334 B1
(45) Date of Patent: *Jan. 22, 2008

(54) VALVE ASSEMBLY

(75) Inventors: Robert E. Trimble, Sullivan, IL (US);
Tage Christiansen, Nordborg (DK);
Anders Kryhlmand, Sydals (DK);
Thomas Kopel, Sullivan, IL (US)

(73) Assignee: Hydro-Gear Limited Partnership,
Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/423,744

(22) Filed: Jun. 13, 2006

Related U.S. Application Data

(60) Continuation of application No. 11/227,571, filed on Sep. 15, 2005, now Pat. No. 7,066,199, which is a division of application No. 11/082,313, filed on Mar. 17, 2005, now Pat. No. 6,964,280, which is a continuation of application No. 10/863,074, filed on Jun. 8, 2004, now Pat. No. 6,986,363, which is a continuation of application No. 10/704,893, filed on Nov. 10, 2003, now Pat. No. 6,761,182, which is a continuation of application No. 10/115,149, filed on Apr. 3, 2002, now Pat. No. 6,691,512, and a continuation of application No. 10/115,315, filed on Apr. 3, 2002, now Pat. No. 6,719,005.

(51) Int. Cl.
*F16K 17/196* (2006.01)

(52) U.S. Cl. ............... 137/493.1; 137/493.3; 137/493.5; 137/493.6; 137/493.8; 137/513.3

(58) Field of Classification Search ............. 137/493.1, 137/493.3, 493.5, 493.6, 493.7, 493.9, 513.3
See application file for complete search history.

(56) References Cited

U.S. PATENT DOCUMENTS

| 115,982 | A | 6/1871 | Porteus |
| 807,269 | A | 12/1905 | Hildebrand et al. |
| 2,393,589 | A | 1/1946 | Compton et al. |
| 3,153,423 | A | 10/1964 | Biello et al. |
| 3,522,999 | A | 8/1970 | Liles |
| 3,782,412 | A | 1/1974 | Darash |
| 4,016,903 | A | 4/1977 | Akashi et al. |
| 4,300,591 | A | 11/1981 | Sutton |
| 4,494,624 | A | 1/1985 | Scheuerle |
| 4,637,430 | A | 1/1987 | Scheffel et al. |
| 4,905,656 | A | 3/1990 | Betterton et al. |
| 4,915,126 | A | 4/1990 | Gyllinder |

(Continued)

OTHER PUBLICATIONS

Circle Seal Controls., 100 Series Check Values, Corona, California, www.circle-seal.com.

(Continued)

*Primary Examiner*—Stephen M. Hepperle
(74) *Attorney, Agent, or Firm*—Neal, Gerber & Eisenberg

(57) ABSTRACT

A valve for use in regulating the flow of fluid between a first fluid side and a second fluid side of a hydraulic circuit. A bore is extended through a valve seat, and the bore and valve stem cooperate to form a fluid passage from the first side to the second side. A plurality of ribs are located on one side of the valve seat and extend in a direction generally parallel to the bore.

14 Claims, 11 Drawing Sheets

U.S. PATENT DOCUMENTS

| | | | |
|---|---|---|---|
| 4,948,092 A | | 8/1990 | Kasper et al. |
| 5,000,222 A | | 3/1991 | Moenkhaus et al. |
| 5,058,961 A | | 10/1991 | Mergenthaler et al. |
| 5,105,850 A | | 4/1992 | Harris |
| 5,166,445 A | * | 11/1992 | Vertanen .................. 137/493.6 |
| 5,333,451 A | | 8/1994 | Sakikawa |
| 5,378,118 A | | 1/1995 | Phillips |
| 5,412,948 A | | 5/1995 | Komura et al. |
| 5,454,223 A | | 10/1995 | Tschida et al. |
| 5,542,384 A | | 8/1996 | Rosenmann et al. |
| 5,546,752 A | | 8/1996 | Horton |
| 5,632,467 A | * | 5/1997 | Just et al. ............... 251/129.21 |
| 5,687,468 A | | 11/1997 | Hans et al. |
| 6,045,116 A | | 4/2000 | Willke et al. |
| 6,073,444 A | | 6/2000 | Horton et al. |
| 6,079,957 A | | 6/2000 | Jirele |
| 6,332,393 B1 | | 12/2001 | Trimble |
| 6,406,272 B2 | | 6/2002 | Ruhardt et al. |
| 6,487,857 B1 | | 12/2002 | Poplawski et al. |
| 6,494,686 B1 | | 12/2002 | Ward |
| 6,675,696 B1 | | 1/2004 | Langenfeld |
| 6,691,512 B1 | | 2/2004 | Kopel et al. |
| 6,719,005 B1 | | 4/2004 | Trimble et al. |
| 6,719,006 B2 | | 4/2004 | Fleischer et al. |
| 6,880,449 B1 | | 4/2005 | Hauser et al. |
| 6,935,454 B1 | | 8/2005 | Hauser |
| 6,968,684 B1 | | 11/2005 | Hauser |
| 7,001,146 B1 | | 2/2006 | Todd |
| 7,028,708 B1 | | 4/2006 | Langenfeld |
| 7,066,199 B1 | * | 6/2006 | Trimble et al. .......... 137/493.5 |

OTHER PUBLICATIONS

Circle Seal Controls., 200 Series Check Values, Corona California, www.circle-seal.com.

The Lee Company, Lee Cheks, A Guide to Selecting the Right Lee Chek for Your Application, www.theleeco.com.

The Lee Company, Lee Presure Relief Valves, How to Select the Right relieft Valve for Your Application, www.theleeco.com.

Kepner Products Company, Check Valves, 1996-96, www.kepner.com.

Kepner Products Company, Relief Valves, 1996-98, www.kepner.com..

Monsun-Tison, Auxiliary Valves catalog, Jun. 1990 (date not confirmed by Applicant).

* cited by examiner

FIG. II

VALVE ASSEMBLY

CROSS-REFERENCE

This application is a continuation of U.S. application Ser. No. 11/227,571 filed on Sep. 15, 2005; which is a divisional of U.S. application Ser. No. 11/082,313 filed on Mar. 17, 2005, now U.S. Pat. No. 6,964,280; which is a continuation of U.S. application Ser. No. 10/863,074 filed on Jun. 8, 2004, now U.S. Pat. No. 6,986,363; which is a continuation of U.S. application Ser. No. 10/704,893 filed on Nov. 10, 2003, now U.S. Pat. No. 6,761,182; which is a continuation of U.S. application Ser. No. 10/115,149 filed on Apr. 3, 2002, now U.S. Pat. No. 6,691,512 and U.S. application Ser. No. 10/115,315 filed on Apr. 3, 2002, now U.S. Pat. No. 6,719,005. These prior applications are incorporated herein by reference in their entirety.

BACKGROUND OF THE INVENTION

This invention relates generally to the design of valves and, more particularly, to the design of a combination check valve and pressure relief valve.

In the art, check valves and pressure relief valves are known. Generally, a check valve functions to restrict flow in one direction while a relief valve is used to regulate flow pressure. Furthermore, U.S. Pat. No. 4,948,092 discloses a combined check valve and pressure relief valve having a resilient duckbill valve body. Fluid passing through a cylindrical core around a valve actuator functions to open the lips of the duckbill valve body to permit the free flow of the fluid while back pressure functions to seal the lips of the duckbill valve. Manual depression of the valve actuator, however, causes the valve actuator to penetrate and open the valve lips to selectively permit backflow to provide the relief valve function.

A further combination check valve and pressure relief valve is shown in prior art FIG. 13. As illustrated, the combination check valve and pressure relief valve includes a check compression spring 78 and a relief compression spring 81. The check compression spring 78 and relief compression spring 81 cooperate with a valve stem 82, a machined valve seat 83, and valve plug assembly 80 to provide the check valve and pressure relief functions. To establish the opening characteristics of the valve, a wet set procedure is utilized which involves setting the valve in a test stand and using fluid to activate the valve. The valve configuration is then adjusted, for example by turning a set screw, until the valve shows the desired amount of opening, based either on flow, or pressure, or both. While this wet set process works for its intended purpose, it does suffer the disadvantages of being time consuming and expensive. The use of a machined valve seat also increases the relative cost of the valve while further disadvantageously limiting the physical characteristics that can be provided to the valve seat. Still further, the large size of the compression spring 81, disadvantageously requires the machining of holes in the valve seat to provide a means for relief fluid flow (since the size of spring 81 provides no fluid flow passages through spring 81). The size of spring 81 additionally increases the overall size of the valve assembly thereby preventing use of this valve in applications such as integrated hydrostatic transaxles.

SUMMARY OF THE INVENTION

To overcome these, and other disadvantages, a combination check valve and pressure relief valve is provided for use in regulating the flow of fluid between a first fluid side and a second fluid side. The combination check valve and pressure relief valve includes a valve plug, a valve guide moveably positioned in relation to the valve plug, a valve stem engaged to the valve guide, a check compression spring attached to the valve stem and positioned between the valve guide and the valve plug, a valve seat carried by the valve stem, and a relief compression spring positioned between the valve seat and the valve guide. The valve guide is adapted to move the valve stem relative to the valve seat against the force of the relief compression spring to allow fluid to pass from the first fluid side to the second fluid side through a fluid flow passage formed between the valve stem and the valve seat. Furthermore, the valve seat, valve stem, and valve guide are adapted to move relative to the valve plug against the force of the check compression spring to thereby remove the valve seat from an opening formed between the second fluid side and the first fluid side to permit fluid to pass through the opening.

Advantageously, a dry set procedure is used to set the valve configuration. Furthermore, a valve seat having complex geometries may be manufactured using metal injection molding. A better understanding of these and other advantages, objects, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
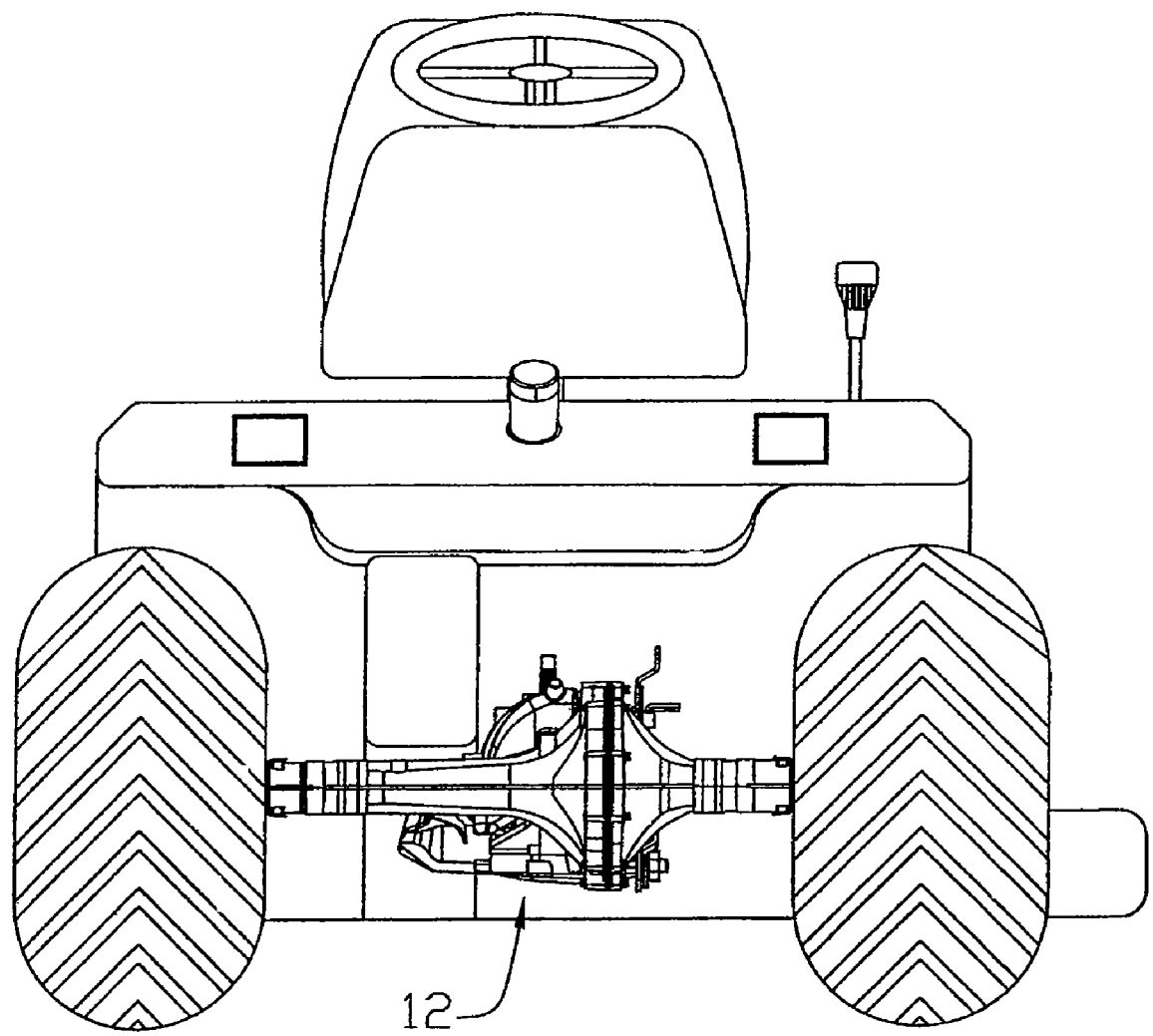
FIG. 1 illustrates a rear view of a tractor using an exemplary transmission constructed in accordance with the subject invention.
Figure 2:
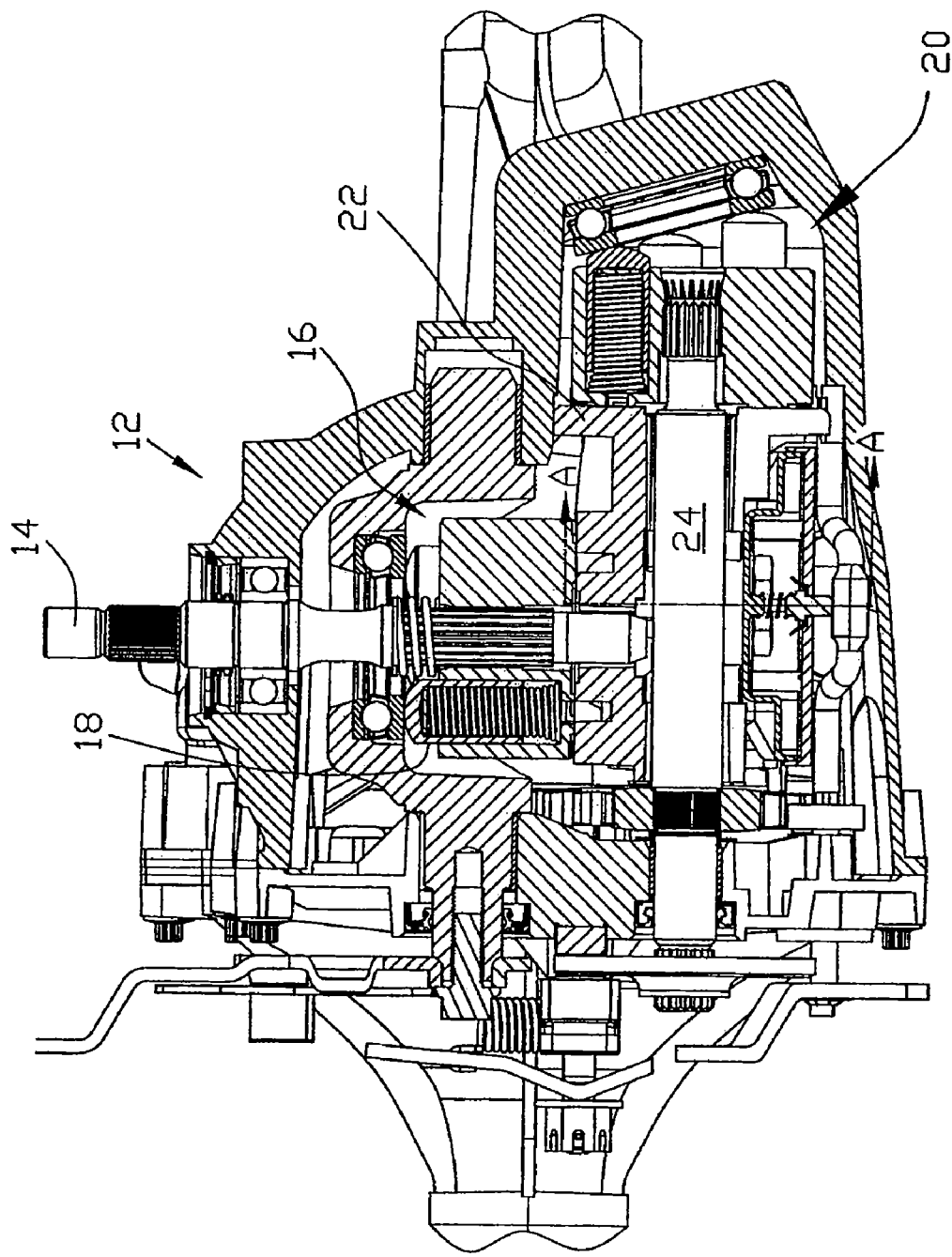
FIG. 2 illustrates a cross-sectional, front view of the transmission of FIG. 1.
Figure 3:
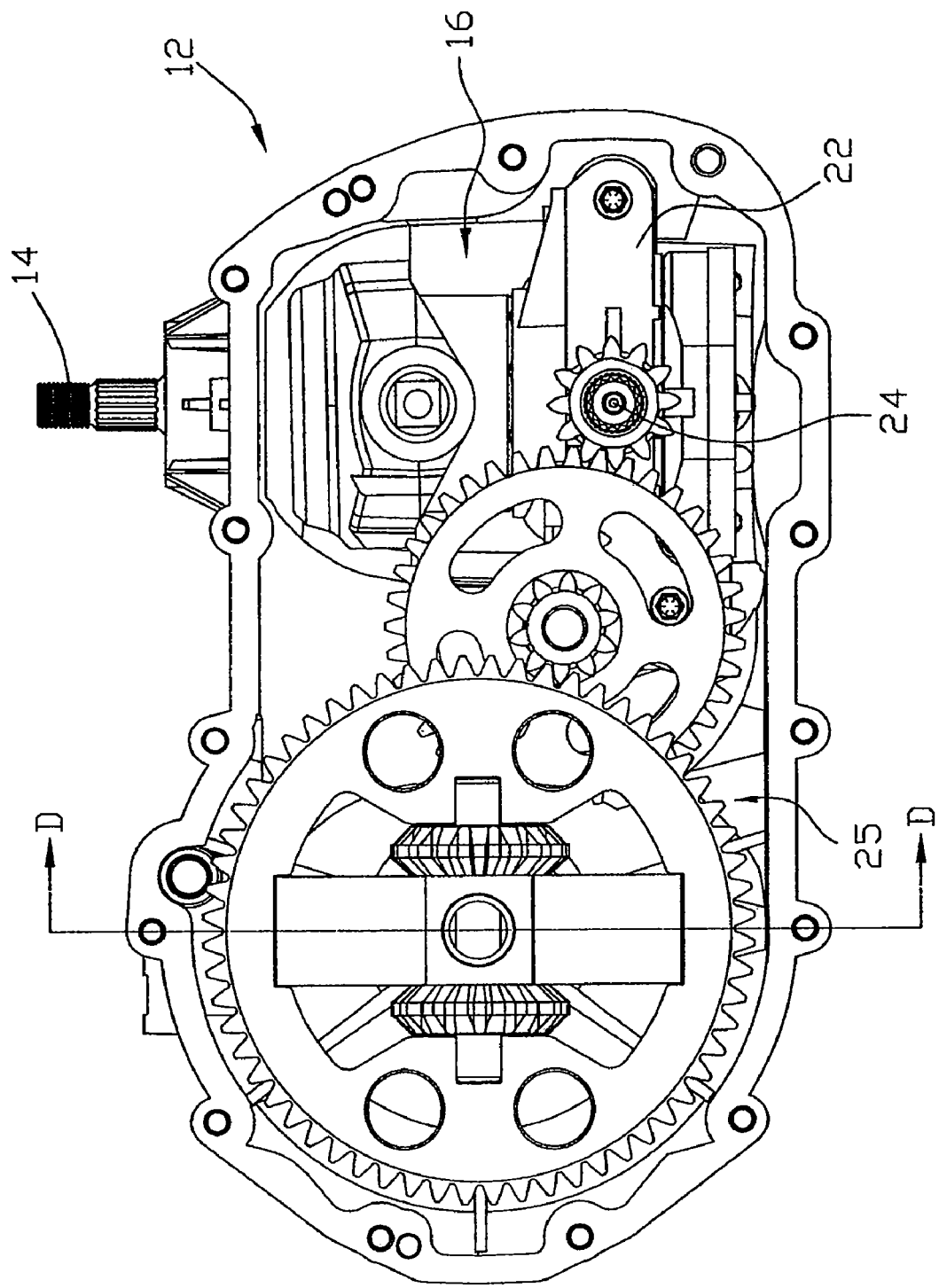
FIG. 3 illustrates a side view of the transmission of FIG. 1 with the side housing removed to expose certain components.
Figure 4:
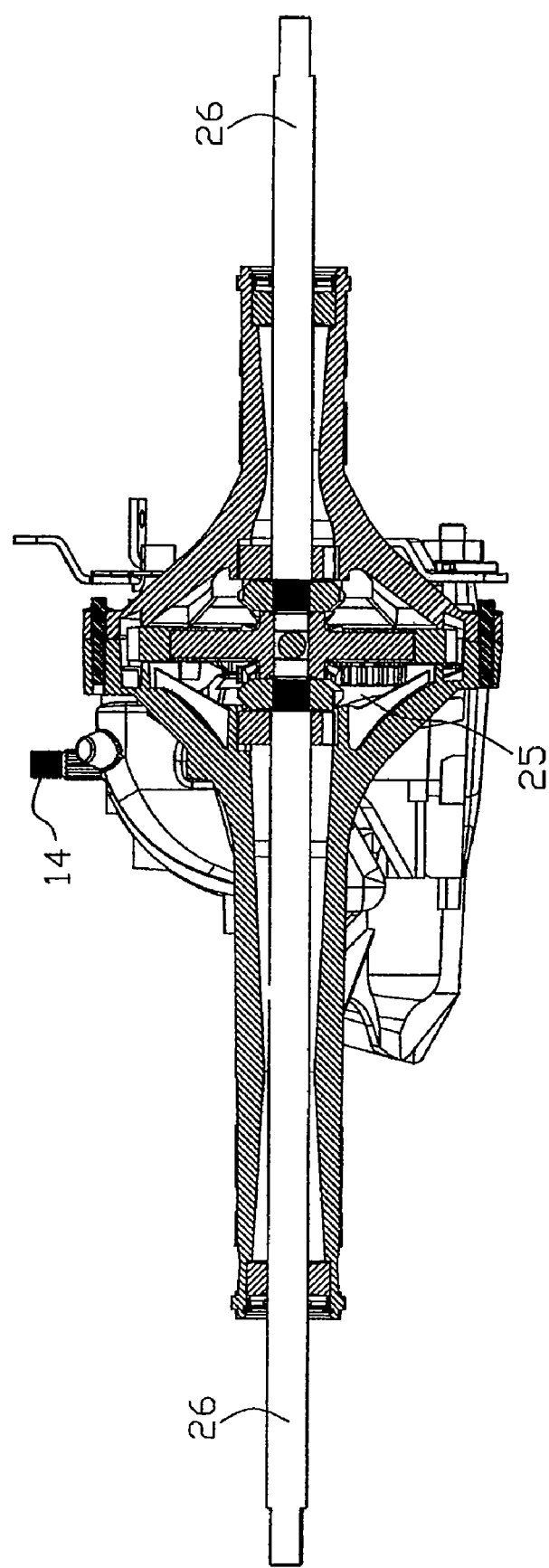
FIG. 4 illustrates a cross-sectional back view of the transmission along line D-D of FIG. 3 with the components missing from FIG. 3 restored.
Figure 5:
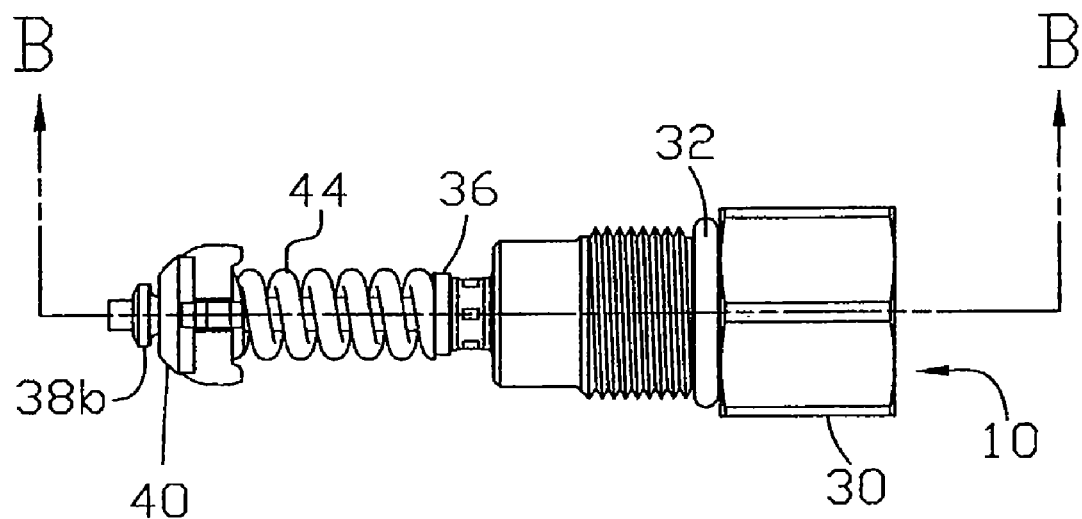
FIG. 5 illustrates a side view of a combination check valve and pressure relief valve and a valve plug useable in connection with the end cap of FIG. 12.
Figure 6:
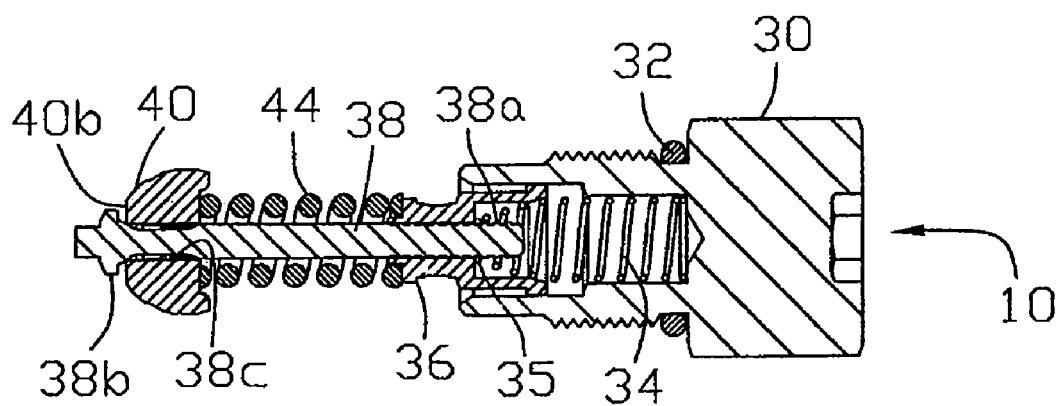
FIG. 6 illustrates a cross-sectional view of the combination check valve and pressure relief valve along line B-B of FIG. 5.
Figure 7:
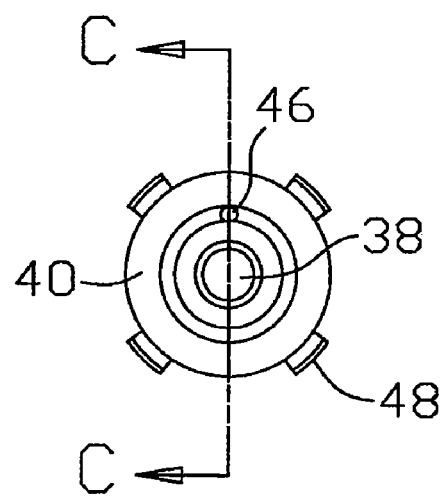
FIG. 7 illustrates a front view of the combination check valve and pressure relief valve of FIG. 5 without a valve plug.

Turning now to the figures, wherein like reference numerals refer to like elements, there is generally illustrated in FIGS. 5-9 a combination check valve and pressure relief valve 10. While the combination check valve and pressure relief valve 10 will be described in the context of a hydrostatic transmission, it is to be understood that this description is not intended to be limiting. Rather, from the description that follows, those of ordinary skill in the art will appreciated that the combination check valve and pressure relief valve 10 may be utilized in connection with a myriad of additional applications.

With reference to FIGS. 1-4, the combination check valve and pressure relief valve 10 is particularly suited for use in connection with a hydraulic circuit of a hydrostatic transmission 12. In this regard, the hydrostatic transmission 12 generally operates on the principle of an input shaft 14 rotatably driving a hydraulic pump 16 which, through the action of its pump pistons 18, pushes hydraulic fluid to a hydraulic motor 20 through a center section 22 to cause the rotation of the hydraulic motor 20. The rotation of the hydraulic motor 20 causes the rotation of a motor shaft 24 which rotation is eventually transferred through a gearing system or the like 25 to drive one or a pair of axle shafts 26. A motive force may be supplied directly to the input shaft 14 or indirectly by means of pulleys and belts which are connected to an internal combustion engine. For a more detailed description of the principles of operation of such a hydrostatic transmission, the reader is referred to U.S. Pat. Nos. 5,201,692, and 6,322,474 which are incorporated herein by reference in their entirety.

For placing the hydraulic pump 16 in fluid communication with the hydraulic motor 20, the center section 22 includes hydraulic porting. The hydraulic porting is in further fluid communication with a source of makeup fluid, such as a fluid sump or a charge gallery. Generally, the hydraulic porting comprises a high pressure side through which fluid moves from the hydraulic pump 16 to the hydraulic motor 20 and a low pressure side through which fluid returns from the hydraulic motor 20 to the hydraulic pump 16. Since fluid tends to leak from the hydraulic porting, the hydraulic pump 16 generally requires more fluid than is returned from the hydraulic motor 20 via the low pressure side porting. This requirement for fluid may, however, be satisfied by using the combination check valve and pressure relief valve 10. Generally, the combination check valve and pressure relief valve 10 functions to prevent the flow of fluid from the hydraulic porting to the source of makeup fluid while allowing fluid to flow from the source of makeup fluid into the hydraulic porting when the fluid pressure in the hydraulic porting is lower relative to the fluid pressure in the source of makeup fluid. In cases where the fluid pressure in the porting is excessive, determined on a application by application basis, the combination check valve and pressure relief valve 10 further functions to relieve this excess fluid pressure by allowing fluid to be discharged from the hydraulic porting to the source of makeup fluid.

Figure 11:
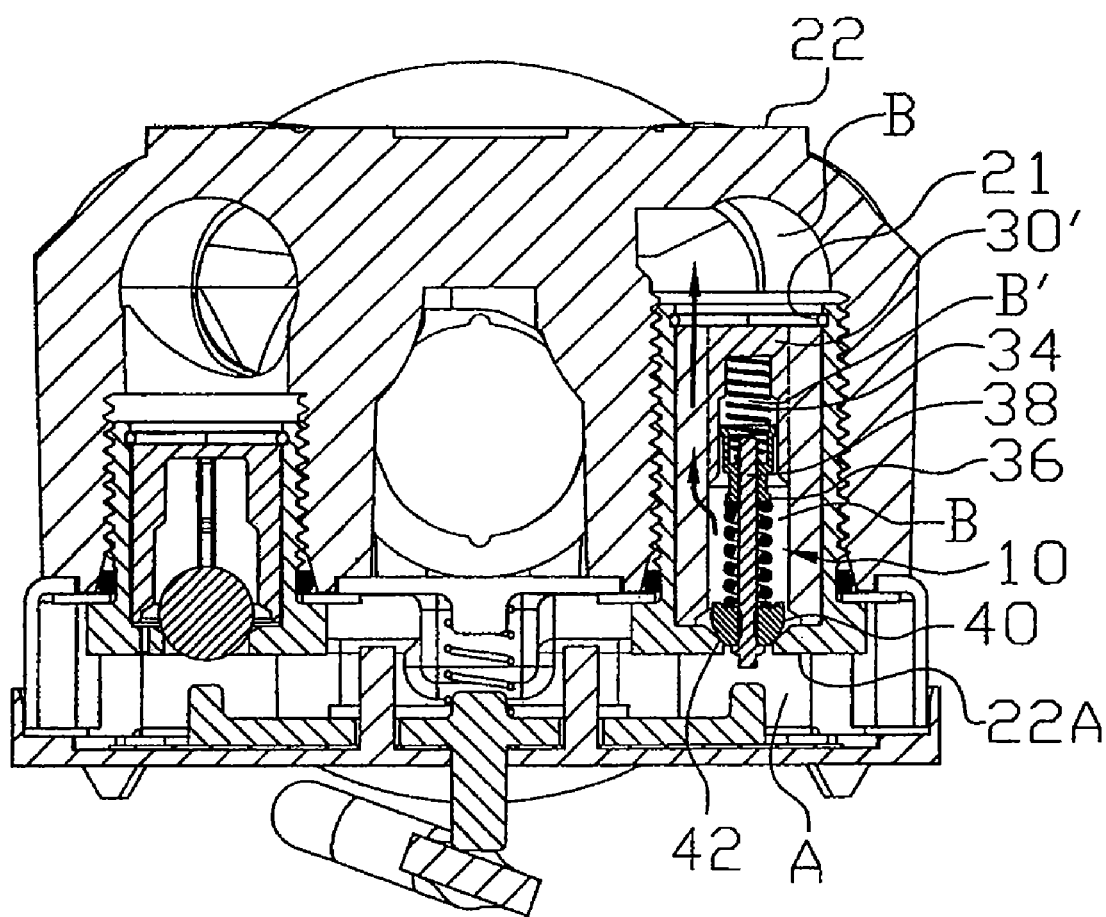
FIG. 11 illustrates a cross-sectional view of a center section for a single pump hydrostatic transmission in which the combination check valve and pressure relief valve of FIGS. 5-8 is installed taken along line A-A of FIG. 2.
Figure 12:
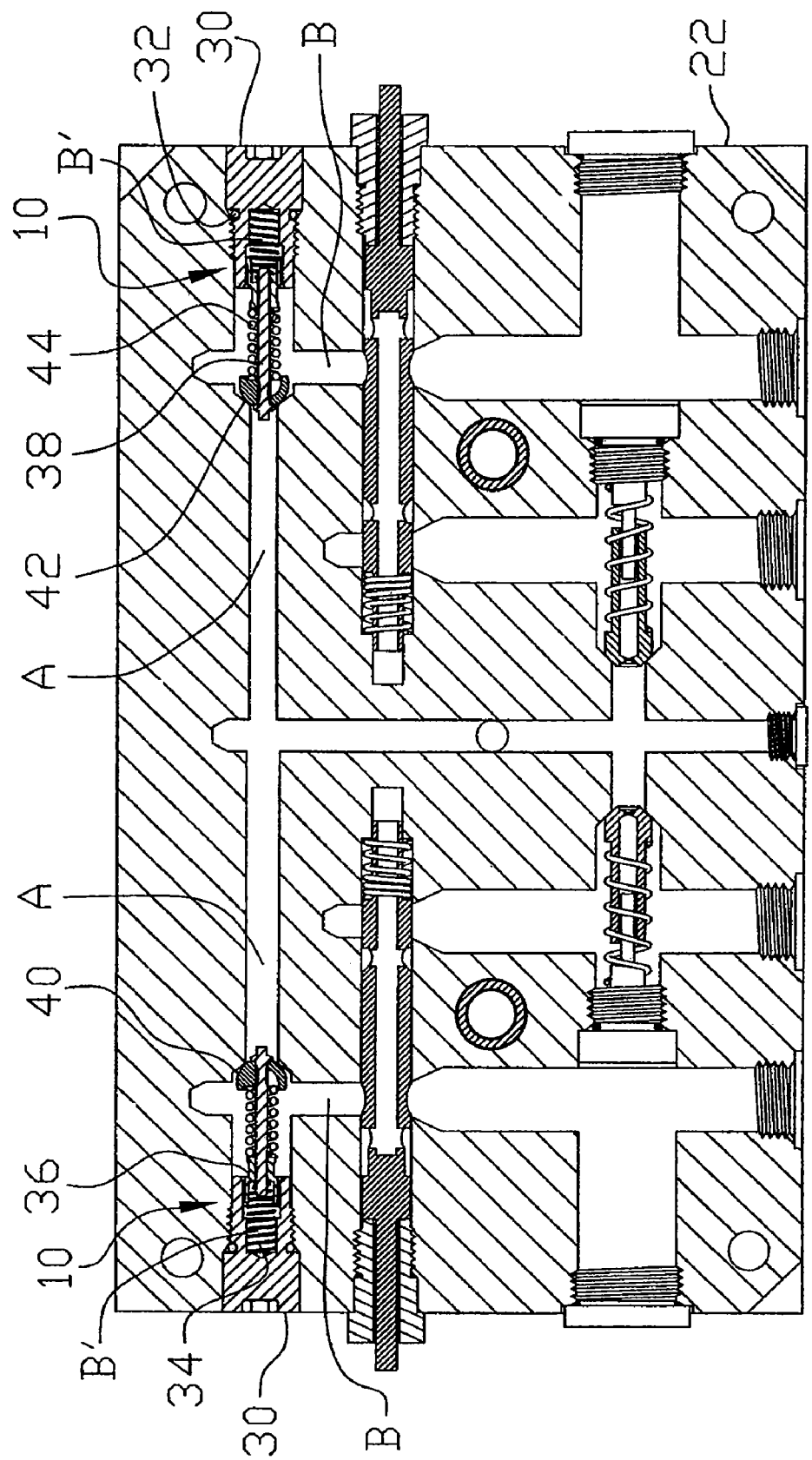
FIG. 12 illustrates a cross-sectional view of a center section for a dual pump hydrostatic transmission in which the combination check valve and pressure relief valve of FIGS. 5-8 is installed.

To this end, the combination check valve and pressure relief valve 10 may be mounted in the center section 22 between a first fluid side A and second fluid side B. In the application described herein, the first fluid side A is associated with the source of makeup fluid while the second fluid side B is associated with the porting that provides a fluid path between the hydraulic pump 16 and hydraulic motor 20. By way of example, FIG. 11 illustrates the combination check valve and pressure relief valve 10 installed in an exemplary center section 22 for a single pump hydrostatic transmission carried as part of an integrated hydrostatic transaxle. FIG. 12 illustrates the combination check valve and pressure relief valve 10 installed in an exemplary center section for a dual pump hydrostatic transmission which may be used in connection with a stand-alone hydrostatic transmission. It will be understood, however, that these illustrated embodiments are not intended to be limiting. Rather, the combination check valve and pressure relief valve 10 may be used in connection with any closed hydraulic circuit where there is a need for makeup fluid.

To secure the combination check valve and pressure relief valve 10 in the center section 22, a valve plug 30 may be threaded to mate with corresponding threads provided in the center section 22 as illustrated in FIG. 12. As further illustrated in FIG. 12, an O-ring 32 may be provided to prevent the leakage of fluid from the junction between the combination check valve and pressure relief valve 10 and the center section 22. Other manners for securing the combination check valve and pressure relief valve 10 in the center section 22 are also contemplated. For example, as illustrated in FIG. 11, the valve plug 30' may be carried within a threaded insert 22A that is to be considered a part of the center section 22. In this case, a retaining ring 21 may also be utilized to maintain the valve plug 30' within the threaded insert 22A.

Figure 8:
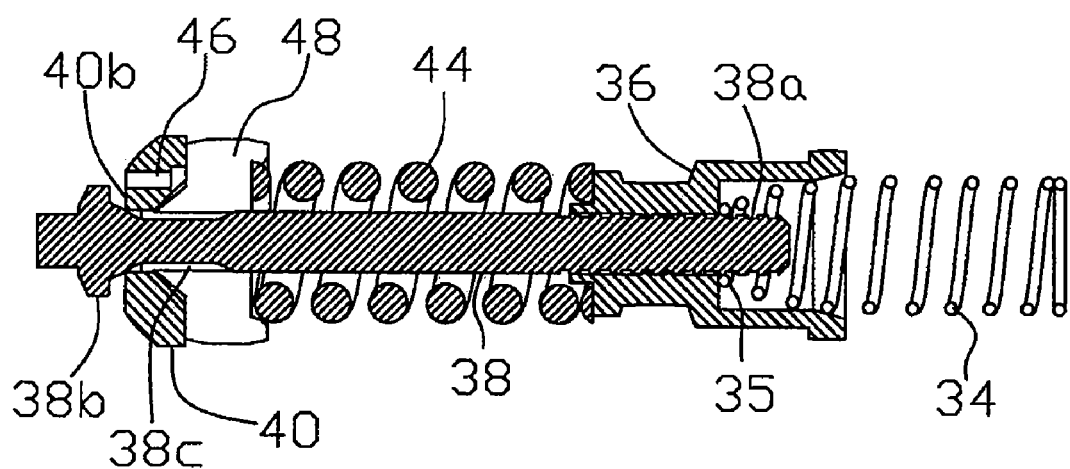
FIG. 8 illustrates a cross-sectional view of the combination check valve and pressure relief valve along line C-C of FIG. 7.
Figure 9:
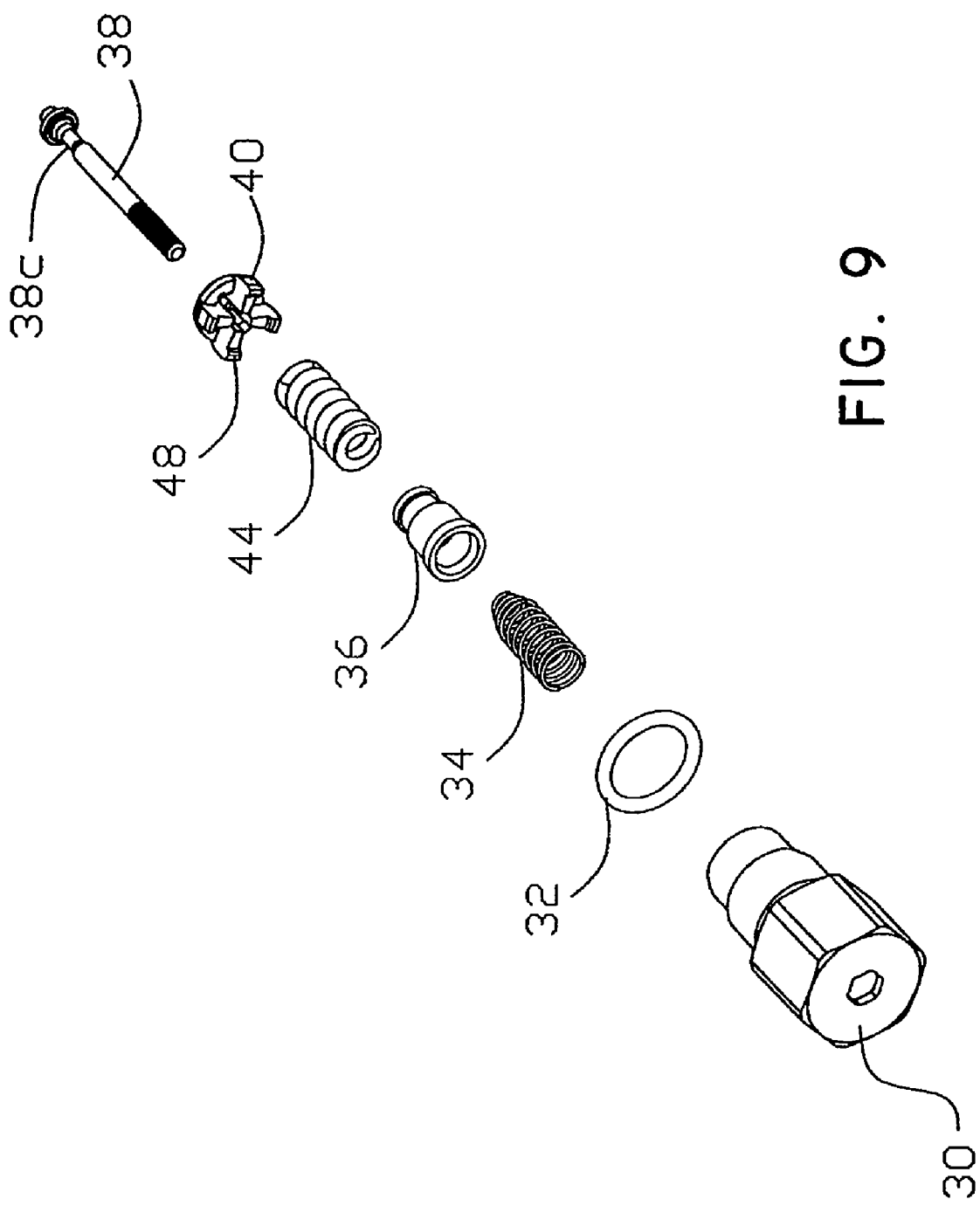
FIG. 9 illustrates an exploded view of the combination check valve and pressure relief valve of FIGS. 5-8 including a valve plug.

To allow for the flow of fluid from fluid side A to fluid side B when fluid side B is under lower pressure relative to fluid side A, the combination check valve and pressure relief valve 10 includes a check compression spring 34 as illustrated in FIGS. 5-9. In this regard, the check compression spring 34 is positioned between the valve plug 30 and a valve guide 36 which is carried within and moveable with respect to the valve plug 30. The valve guide 36 is, in turn, attached to a valve stem 38 which cooperatively engages a valve seat 40. The check compression spring 34 may be attached to the valve stem 38 by providing the compression spring 34 with a portion 35 having a diameter sized to mate with grooves or threads formed on a first end 38a of the valve stem 38, as illustrated in FIG. 8.

More specifically, when the force on the valve stem 38 caused by the fluid pressure differential is sufficient to overcome the restoring force of the check compression spring 34, the fluid pressure differential will influence the valve stem 38 and the attached valve guide 36 to compress the check compression spring 34 into the valve plug 30. During this movement of the valve stem 38, an enlarged portion 38b of the valve stem 38 engages a second surface 40b of the valve seat 40 and causes the valve seat 40 to move away from a valve seat surface 42 formed in the center section 22. The valve seat surface 42 can be integrally formed with the center section 22 as illustrated in FIG. 12 or may be a part of the threaded insert 22A as illustrated in FIG.

11. In this manner, the movement of the valve seat 40 away from the valve seat surface 42 breaks a sealing engagement between the valve seat 40 and the valve seat surface 42 to allow the fluid under pressure in fluid side A to flow into fluid side B through an opening defined within the valve seat surface 42.

Once the pressure differential and flow of fluid from fluid side A is no longer sufficient to overcome the restoring force of the compression check spring 34, the compression check spring 34 return force urges the valve guide 36 and valve stem 38 back towards the valve seat surface 42. This movement of the valve guide 36 and valve stem 38 functions to return the valve seat 40 into sealing engagement with the valve seat surface 42 to thereby prevent the flow of fluid through the opening defined by the valve seat surface 42. In this regard, the valve seat 40 moves with the valve guide 36 and valve stem 38 owing to a relief compression spring 44 which is disposed around the valve stem 38 between the valve guide 36 and the valve seat 40 and which generally biases the valve seat 40 against the enlarged portion 38b of the valve stem 38 when the valve seat 40 is not engaged with the valve seat surface 42.

To allow for the flow of fluid from fluid side B to fluid side A when the fluid in fluid side B is under excessively high pressure relative to the fluid in fluid side A, a flow passage 38c is formed in the valve stem 38. While not intended to be limiting, the flow passage 38c is illustrated as being a reduced diameter portion formed in the valve stem 38 that cooperates with an opening in the valve seat 40. In particular, when the force resulting from the fluid pressure differential is sufficient to overcome the restoring force of the relief compression spring 44, the valve stem 38 is caused to move relative to the valve seat 40, which is normally in sealing engagement with the valve seat surface 42, such that the end of flow passage 38c extends beyond the valve seat 40 to thereby allow fluid to flow from fluid side B to fluid side A through the flow passage 38c.

For allowing the valve stem 38 to move as a result of the excess pressure in fluid side B, a small gap (for example, 0.004 to 0.009 inches diametrically) is provided between the valve guide 36 and the valve plug 30. This gap allows fluid to flow into the space B' formed behind the valve guide 36. In this manner, when the pressure within the space B' behind the valve guide 36 builds to a certain point, which is established primarily by the hole diameter in the valve seat 40 and rate of the relief compression spring 44, the fluid pressure differential causes the valve stem 38 and the attached valve plug 30 to move and compress the relief compression spring 44 in the manner described above. As further illustrated in FIG. 11, the valve plug 30' may be provided with fins that provide fluid access around valve plug 30' to the volume behind the valve guide 36 (as illustrated by the arrows in FIG. 11) while also providing stability to the moving valve guide 36.

As pressure continues to build in fluid side B relative to fluid side A, the valve guide 36 is compressed further, the valve stem 38 moves further relative to the valve seat 40, and more of the fluid flow passage 38c is exposed to fluid side A. Thus, the opening of fluid side B to fluid side A via the fluid flow passage 38c is not abrupt, and pressure can continue to build in fluid side B. However, this pressure build up is at a steadily decreasing rate as compared to a hydraulic circuit in which no combination check valve and relief valve 10 is utilized.

Disadvantageously, the flow of fluid through the flow passage 38c can set up an oscillatory motion which, in some cases, can be detected as a vibration or pulse in certain applications such as hydrostatic transmissions. The small gap between the valve guide 36 and the valve plug 30, however, functions to reduce or eliminate such oscillatory movement. In particular, this results from the time it takes for the fluid to move into and out of the space B' behind the valve guide 36.

When the fluid pressure differential is no longer sufficient to overcome the restoring force of the relief compression spring 44, the relief compression spring 44 forces the valve guide 36 and attached valve stem 38 back towards the valve plug 30. This movement of the valve stem 38 causes the fluid flow passage 38c to move back into the valve seat 40. This movement of the fluid flow passage 38c back towards the valve seat 40 causes less of the fluid flow passage 38c to be exposed to fluid side A until such time as the valve stem 38 sealingly engages the valve seat 40 to close the fluid flow passage 38c. It will be appreciated that the movement of the valve stem 38 under the influence of the relief compression spring 44 is dampened as the movement of the valve guide 36 towards the valve plug 30 causes fluid to be forced from the volume behind the valve guide 36 through the gap between the valve guide 36 and the valve plug 30.

To reduce cost, the valve seat 40 of the combination check valve and pressure relief valve 10 is preferably manufactured using a metal injection molding ("MIM") process. The metal injection molding process also allows the valve seat 40 to be provided with a bleed orifice 46, a rib structure 48 (which provides fluid access passageways to the center opening in the valve seat 40 as well as engagement surfaces for the spring 44), and the opening configuration that cooperates with the fluid flow path 38c. Importantly, the MIM process allows the small bleed orifice 46 to be provided with orifice diameters depending upon the application in which the combination check valve and pressure relief valve 10 is to be utilized by easily changing inserts used in the MIM process. It would be extremely difficult and costly to machine the valve seat 40 to achieve the features above described.

Figure 13:
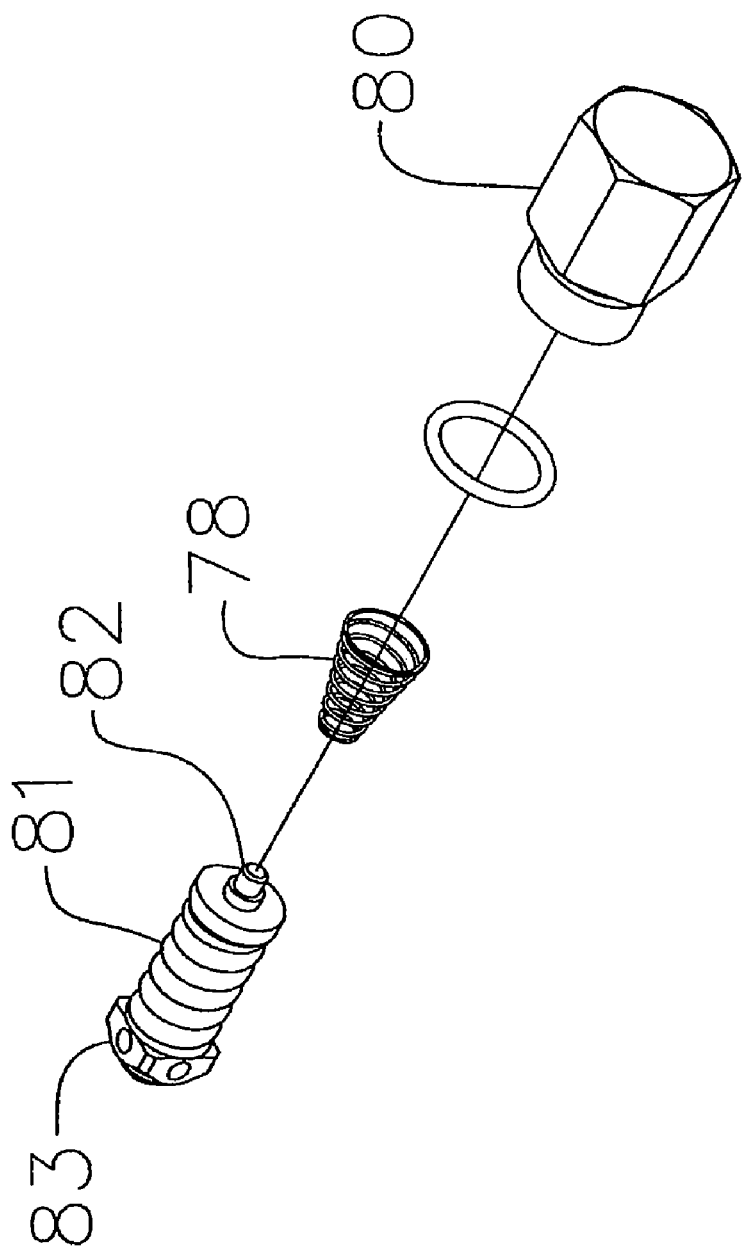
FIG. 13 illustrates a prior art combination check valve and pressure relief valve.

Cost of assembly of a hydrostatic transmission utilizing the described combination check valve and pressure relief valve 10 is also reduced. In this regard, since the check compression spring 34 is attached to the back end 38a of the valve stem 38, the combination check valve and pressure relief valve 10 can be installed using a simplified process. To this end, the valve plug 30 as shown in FIG. 12 need only be installed after the configured components of the check valve and pressure relief valve 10 are dropped into the center section 22. Note that the O-ring would be positioned on the valve plug 30 at the time of assembly. In contrast, prior techniques for installing valves required springs, such as spring 78 in prior art FIG. 13, to be installed loosely into a device. Thus, the presently described manner of assembly also has the advantage of generally eliminating the risk that the parts are misassembled or that the spring 34 becomes loose within the hydraulic circuit.

Figure 10:
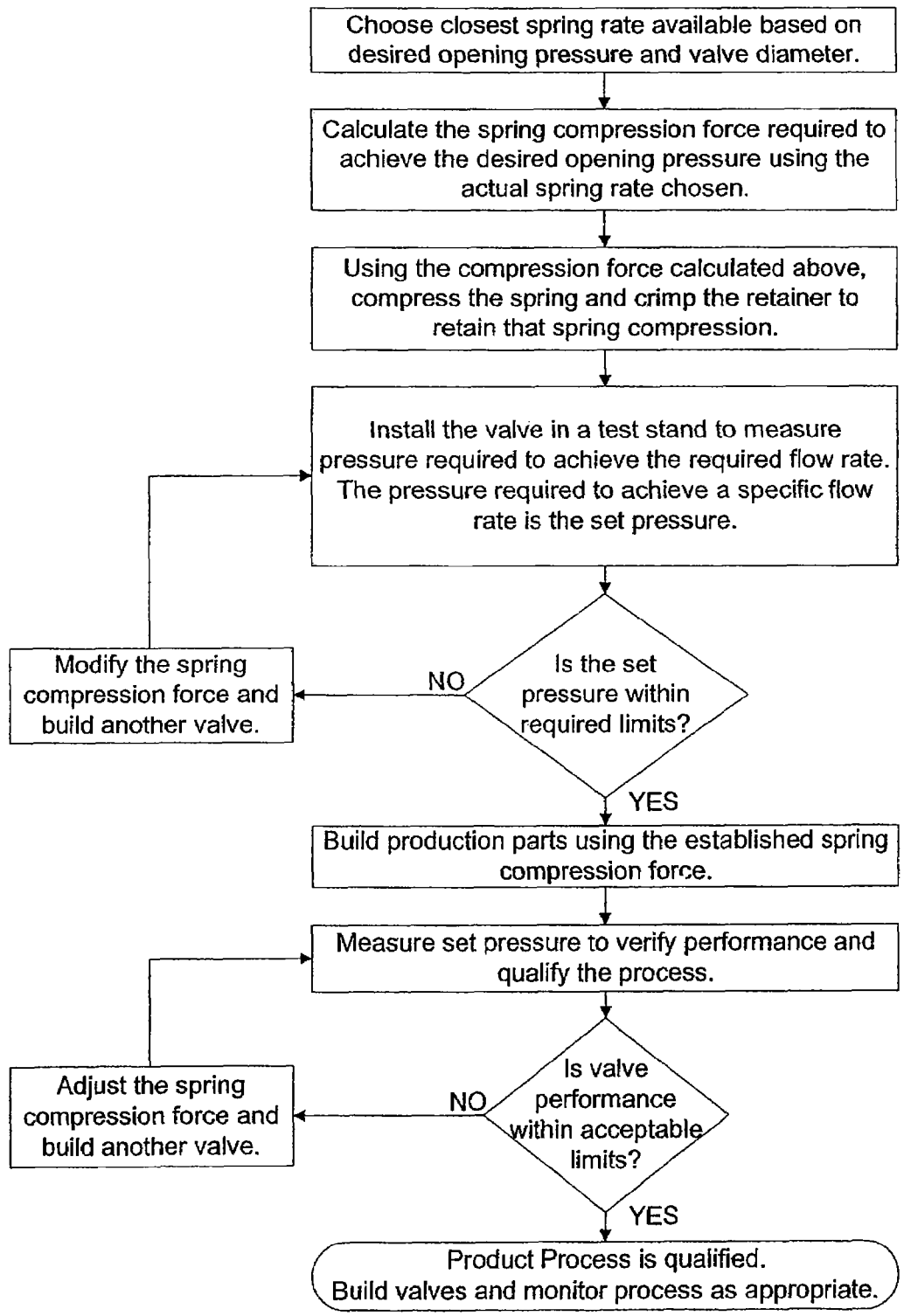
FIG. 10 is a flow chart diagram of exemplary steps used to configure the combination check valve and pressure relief valve of FIGS. 5-8.

To configure the combination check valve and pressure relief valve 10 for use in connection with a given application, a dry set procedure, as illustrated in FIG. 10, may be utilized. The dry set procedure is utilized to set the relief compression spring 44 to a certain spring compression within the assembled valve 10 to allow the valve 10 to operate with a particular pressure and to provide a specific amount of fluid flow through the fluid flow path 38c at a particular pressure. The dry set procedure is performed by selecting a compression spring 44 that has a spring rate that is believed will provide the desired fluid flow at a desired opening pressure considering the valve stem diameter. The spring compression force required to achieve the desired opening pressure using the actual spring rate chosen is then calculated in a manner well known to those of skill in the art. The valve guide 36 is then moved to a point where the compression spring 44 is compressed between the valve guide 36 and the valve seat 40 at the calculated compression force upon which the valve guide 36 is crimped to attach the valve guide 36 to the valve stem 38.

The valve 10 may then be tested to ensure that the proper spring rate and the proper valve guide 36 set position were selected to achieve the desired flow rate. This testing may be performed by installing the valve 10 in a test stand to measure the pressure required to achieve the required flow rate. If the testing proves successful, production parts can be manufactured using the selected spring rate and valve guide set position. While this dry set procedure is not as accurate as using fluid to set the opening point of the valve, the dry set procedure does give adequate tolerances for hydrostatic transmission application (e.g., approximately +/−9% psi variation from valve to valve). It is contemplated that the dry-set procedure may be modified to improve these tolerances if needed for a given application. By way of example, the compression spring 44 can be set in a manner where the influence of frictional forces are minimized.

While specific embodiments of the invention have been described in detail, it will be appreciated by those skilled in the art that various modifications and alternatives to those details could be developed in light of the overall teachings of the disclosure. For example, while the valve 10 is illustrated as being positioned in the forward side of an hydraulic circuit, it will be appreciated that such a valve 10 can also be positioned in the reverse side of an hydraulic circuit. Accordingly, the particular arrangement disclosed is meant to be illustrative only and not limiting as to the scope of the invention which is to be given the full breadth of the appended claims and any equivalents thereof.

The invention claimed is:

1. A valve for use in a hydraulic system between a first fluid side and a second fluid side, the valve comprising:
 - a valve seat moveable between a first, closed position and a second, open position, the valve seat having a first surface and a second surface connected by a generally circular periphery, wherein fluid flows from the first fluid side to the second fluid side around the periphery when the valve seat is in the second, open position;
 - a first opening formed in the first surface of the valve seat, a second opening formed in the second surface of the valve seat and a first passage extending through the valve seat from the first opening to the second opening, the first passage having a generally annular inner surface;
 - a valve stem extending entirely through the first passage and the first and second openings, the valve stem having a closed position where it prevents fluid from flowing through the first passage and an open position where it permits fluid to flow through the first passage from the second fluid side to the first fluid side; and
 - a plurality of ribs extending generally parallel to the first passage, each rib comprising a first end abutting the second surface of the valve seat, a second end offset from the second surface of the valve seat, an inner edge formed generally tangential to the inner surface of the first passage, an outer edge formed opposite the inner edge and a plurality of sides extending between the first and second ends and extending between the inner and outer edges.

2. The valve of claim 1, further comprising a second passage formed in the valve seat and extending parallel to and offset from the first passage.

3. The valve of claim 1, wherein the valve seat is formed using a metal injection molding (MIM) process.

4. The valve of claim 3, wherein each rib is integrally formed with the valve seat during the metal injection molding (MIM) process.

5. The valve of claim 1, wherein the plurality of ribs consists of four ribs, each rib being formed opposite to one of the other ribs.

6. The valve of claim 5, wherein the plurality of ribs are integrally formed with the valve seat.

7. The valve of claim 6, wherein the second surface of the valve seat further comprises a countersunk portion and the first end of each rib extends into the countersunk portion.

8. A valve for use in a hydraulic system between a first fluid side and a second fluid side, the valve comprising:
 - a valve seat moveable between a first, closed position and a second, open position, the valve seat having a first surface and a second surface connected by a periphery, wherein fluid flows from the first fluid side to the second fluid side around the periphery when the valve seat is in the second, open position;
 - a first opening formed in the first surface of the valve seat, a second opening formed in the second surface of the valve seat and a first passage extending through the valve seat from the first opening to the second opening;
 - a plurality of ribs located on the second surface of the valve seat and extending outwardly therefrom in a direction generally parallel to the first passage, each rib comprising an end offset from the second surface of the valve seat and a plurality of sides extending from the valve seat second surface to the end; and
 - a valve stem extending entirely through the first passage and the first and second openings, the valve stem having a closed position where it prevents fluid from flowing through the first passage and an open position where it permits fluid to flow from the second fluid side to the first fluid side through the first passage and past the sides of the ribs, the valve stem further comprising a reduced diameter portion having a diameter smaller than the diameter of the remainder of the valve stem, wherein the reduced diameter portion of the valve stem cooperates with the first passage to create a fluid flow passage that extends entirely through the valve seat and the reduced diameter portion does not extend past the end of each rib.

9. The valve of claim 8, further comprising a second passage formed in the valve seat and extending parallel to and offset from the first passage.

10. The valve of claim 8, wherein the plurality of ribs consists of four ribs, each rib being formed on an opposite side of the second opening from one of the other ribs.

11. The valve of claim 10, wherein the second surface of the valve seat further comprises a countersunk portion and a second end of each rib extends into the countersunk portion.

12. A valve for use in a hydraulic system between a first fluid side and a second fluid side, the valve comprising:
 - a valve seat moveable between a first, closed position and a second, open position, the valve seat having a first surface and a second surface connected by a periphery, wherein fluid flows from the first fluid side to the second fluid side around the periphery when the valve seat is in the second, open position;

a first passage having an annular cross section and extending through the valve seat from the first surface to the second surface;

a plurality of ribs located on the second surface of the valve seat and extending generally parallel to the first passage, each rib having an end offset from the second surface of the valve seat, an interior edge, an exterior edge and a plurality of sides; and a valve stem having a generally circular cross section and extending entirely through the first passage and wherein at least a portion of the valve stem is adjacent to the interior edge of each rib, the valve stem having a closed position where it prevents fluid from flowing through the first passage and an open position where it permits fluid to flow from the second fluid side to the first fluid side through the first passage and past the sides of the ribs.

13. A valve for use in a hydraulic system between a first fluid side and a second fluid side, the valve comprising:

a valve seat formed using a metal injection molding (MIM) process, the valve seat being moveable between a first, closed position and a second, open position, the valve seat further comprising a first surface and a second surface connected by a periphery, wherein fluid flows from the first fluid side to the second fluid side around the periphery when the valve seat is in the second, open position;

a first opening formed in the first surface of the valve seat, a second opening formed in the second surface of the valve seat and a first passage extending through the valve seat from the first opening to the second opening;

a plurality of ribs located on the second surface of the valve seat and extending outwardly therefrom in a direction generally parallel to the first passage, each rib being integrally formed with the valve seat during the metal injection molding (MIM) process, and each rib comprising an end offset from the second surface of the valve seat and a plurality of sides extending from the valve seat second surface to the end; and a valve stem extending entirely through the first passage and the first and second openings, the valve stem having a closed position where it prevents fluid from flowing through the first passage and an open position where it permits fluid to flow from the second fluid side to the first fluid side through the first passage and past the sides of the ribs.

14. The valve of claim 13, further comprising a second passage formed in the valve seat and extending parallel to and offset from the first passage.

* * * * *